June 26, 1962  J. T. WARKOCZEWSKI  3,040,398
METHOD AND APPARATUS FOR FORMING FINELY PERFORATED RINGS
Filed March 14, 1958  3 Sheets-Sheet 1

INVENTOR.
Joseph T. Warkoczewski
BY
Thos E Scofield
ATTORNEY.

June 26, 1962   J. T. WARKOCZEWSKI   3,040,398
METHOD AND APPARATUS FOR FORMING FINELY PERFORATED RINGS
Filed March 14, 1958   3 Sheets-Sheet 2
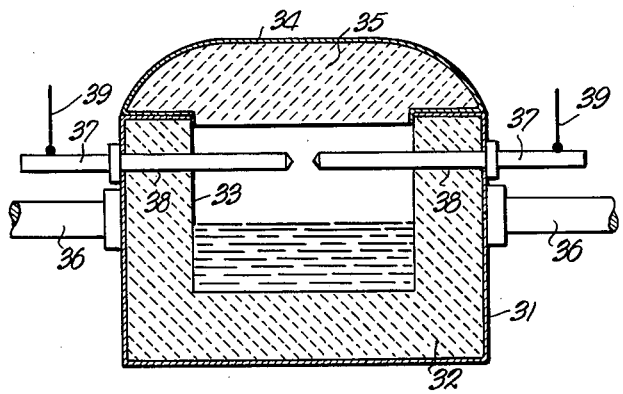
Fig. 3.
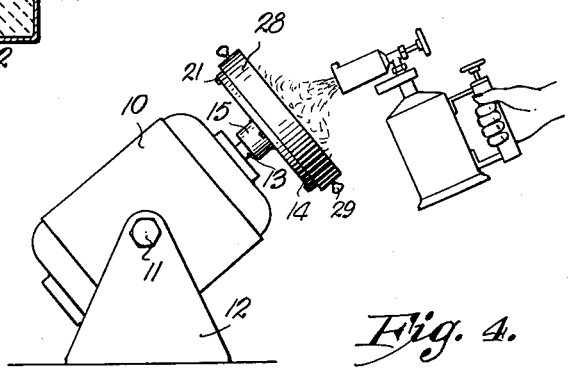
Fig. 4.
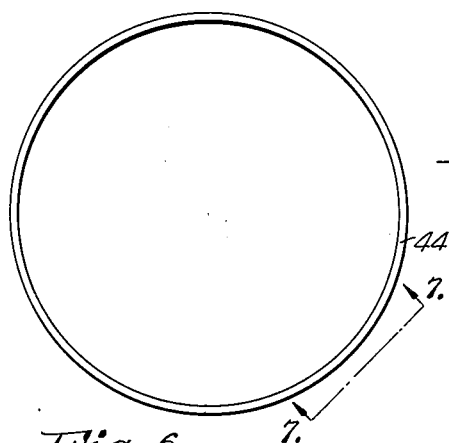
Fig. 6.
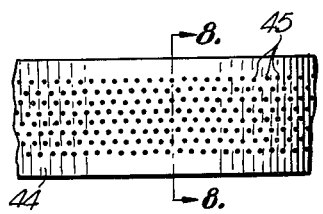
Fig. 7.
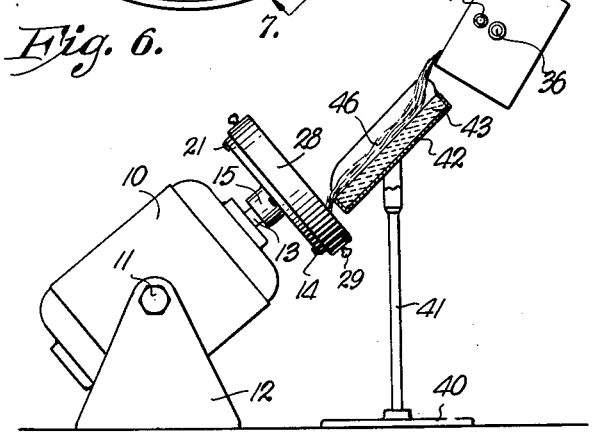
Fig. 5.
Fig. 8.
INVENTOR.
Joseph T. Warkoczewski
BY
Thos. E. Scofield
ATTORNEY.

June 26, 1962 J. T. WARKOCZEWSKI 3,040,398
METHOD AND APPARATUS FOR FORMING FINELY PERFORATED RINGS
Filed March 14, 1958 3 Sheets-Sheet 3

INVENTOR.
Joseph T. Warkoczewski
BY
ATTORNEY.

United States Patent Office 3,040,398
Patented June 26, 1962

3,040,398
METHOD AND APPARATUS FOR FORMING FINELY PERFORATED RINGS
Joseph T. Warkoczewski, Kansas City, Mo., assignor to Gustin-Bacon Manufacturing Company, a corporation of Missouri
Filed Mar. 14, 1958, Ser. No. 721,491
6 Claims. (Cl. 22—65)

This invention relates to methods and apparatus for forming or centrifugally casting finely perforated rings and refers more particularly to such methods and apparatus for forming perforated rings employed in the production of very fine diameter glass fibers.

Apparatus and processes for forming fine diameter glass fibers wherein molten glass is forced through fine diameter perforations in metal rings and the glass streams issuing from the periphery of the ring are attenuated by a high temperature gas blast, or the like, are well known. In this art, the life of such rings and the perforations therein are measured in relatively short periods, ranging from, typically, ten to one hundred hours. As such operations and processes are generally carried on at temperatures in the vicinity of 2,000° F., with the rings rotating at velocities well over 2,000 revolutions per minute, it is evident that the materials of which the rings are formed must have extremely high tensile strengths at elevated temperatures. Additionally, it is necessary that the holes in the rings have internal diameters well below thirty-five thousandths of an inch. These holes optimally would have uniform, perfectly round orifices and square edges at the surfaces of the rings. The production of such rings in sufficient numbers, in relatively short times at a low cost and with the desired characteristics, is a severe problem in the art.

Previously, several methods have been provided of fabricating such rings. One such procedure employs a plurality of relatively small electric arcs which burn the holes through the metal of the ring. This process suffers from the defects of excessive expense, tapering of the hole bores rather than uniform diameter thereof, and a lack of smoothness within the holes. A second conventional process involves individually drilling each hole in the ring, employing fine drills. To date, the time required to drill the number of holes desired (for example, 2600 per ring) and the expense of the resultant rings has made this method also impractical. The necessary qualities of the metal used in the rings causes an extremely high mortality rate of the drill elements. Additionally, some of the preferred alloys used in fabricating such rings rapidly work harden.

Therefore, an object of the invention is to provide methods of and apparatus for casting metal rings having a plurality of uniformly spaced, uniform internal diameter holes or perforations of very small internal diameter therethrough.

Another object of the invention is to provide such methods of and apparatus for casting finely perforated rings of greater thickness than is actually desired in the finished ring whereby to permit machining of one or more of the surfaces thereof to produce the desired thickness in the finished ring, thus permitting control of the character of one or more of the surfaces of the rings.

Another object of the invention is to provide methods of and apparatus for centrifugally casting finely perforated rings around relatively frangible cores which define the perforations in the rings, the cores relatively easily removable from the resultant cast rings.

Still another object of the invention is to provide methods of and apparatus for casting finely perforated rings with high melting point, high tensile strength metal, the resultant rings having a long service life under extremely arduous conditions such as use in processes of forming fine glass fibers.

Another object of the invention is to provide methods of and apparatus for centrifugally casting finely perforated rings quickly, at a minimum cost, with a minimum loss of ring perforations through destruction of the mold cores and wherein no drilling of the metal is required or other like processes to form the finished ring.

Another object of the invention is to provide methods of and apparatus for centrifugally casting finely perforated rings wherein the equipment required is extremely simple and inexpensive.

Another object of the invention is to provide methods of and apparatus for centrifugally casting finely perforated rings which offer very little hazard to the operator.

Yet another object of the invention is to provide methods of and apparatus for uniformly casting finely perforated rings which have an homogeneous structure despite the multiple penetration of the ring and are extremely free of casting faults.

Another object of the invention is to provide methods of and apparatus for casting finely perforated rings wherein a plurality of closely spaced, relatively frangible, very small diameter cores are first positioned in open holes in a mold, then held in position therein while the mold is rotated at high speed, the cores then surrounded with high temperature metal moved among them at a high velocity, all of these steps accomplished without displacing, distorting or breaking the cores.

Yet another object of the invention is to provide, for a centrifugally casting apparatus, a construction for mounting delicate, small diameter cores in a rotatable mold, uniformly spacing them circumferentially of the mold, holding them secure relative one another in high speed rotation of the mold and yet permitting easy removal of the cores both from the cast object and the mold after the casting process has been completed.

Still another object of the invention is to provide methods of and apparatus for casting finely perforated rings which provide the advantages of centrifugal casting, such as homogeneity and high density of the casting, yet also provide advantages generally obtained only in static or investment casting relative the cores employed and casting tolerances involved.

Another object of the invention is to provide methods of and apparatus for centrifugally casting finely perforated metal rings which provide a high consistency of results, wherein the molds are useable over and over and the castings are easily removable from the molds.

Other and further objects of the invention will appear in the course of the following description thereof.

In the drawings, which form a part of the instant invention and are to be read in conjunction therewith, embodiments of the invention are shown and, in the various views, like numerals are employed to indicate like parts.

FIG. 3 is a side-sectional view of a typical furnace adaptable for use in practicing the invention.

FIG. 4 is a schematic side view of a stage of the inventive method.

FIG. 5 is a schematic side view with parts in section of another stage in the practice of the inventive method.

FIG. 6 is a plan view of a ring cast by the inventive process.

FIG. 7 is a view taken along the lines 7—7 of FIG. 6 in the direction of the arrows.

FIG. 8 is a view taken along the lines 8—8 of FIG. 7 in the direction of the arrows.

Referring first to FIGS. 1, 2, 4 and 5, therein is shown apparatus for mounting and rotating a centrifugal casting mold within which the invention may be practiced. A typical power source 10 is pivotally mounted by tightenable screw shaft 11 on base 12. Power source drive shaft 13 which extends from the upper end thereof. The power source and mold mounted thereon may be tilted as in FIGS. 4 and 5 and fixed in this position by tightening of the conventional screw shaft 11. However, the position from which the inventive process begins is preferably with the power source 10 and shaft 13 in vertical position.

Figure 1:
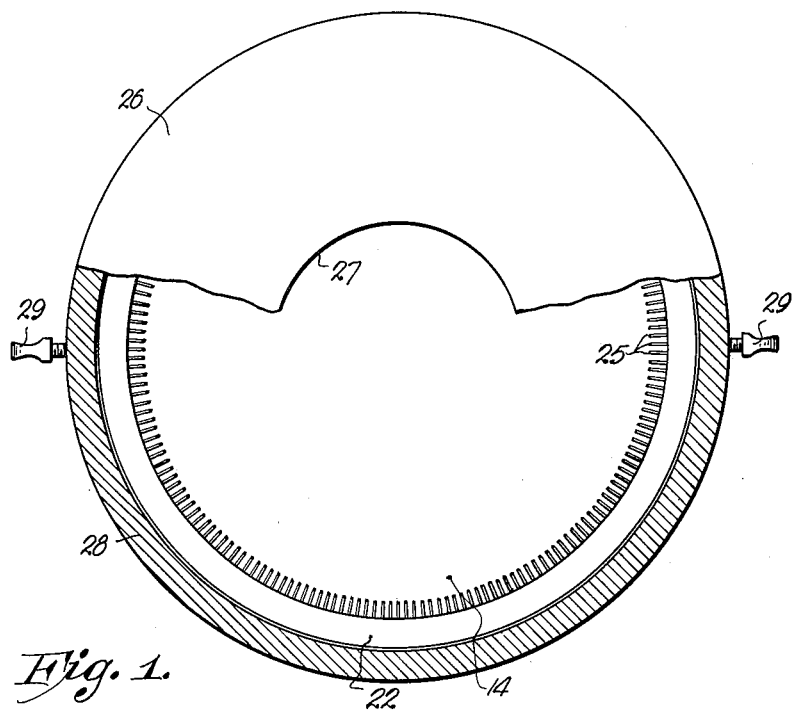
FIG. 1 is a plan view with parts cut away of a rotatable mold embodying the invention.
Figure 2:
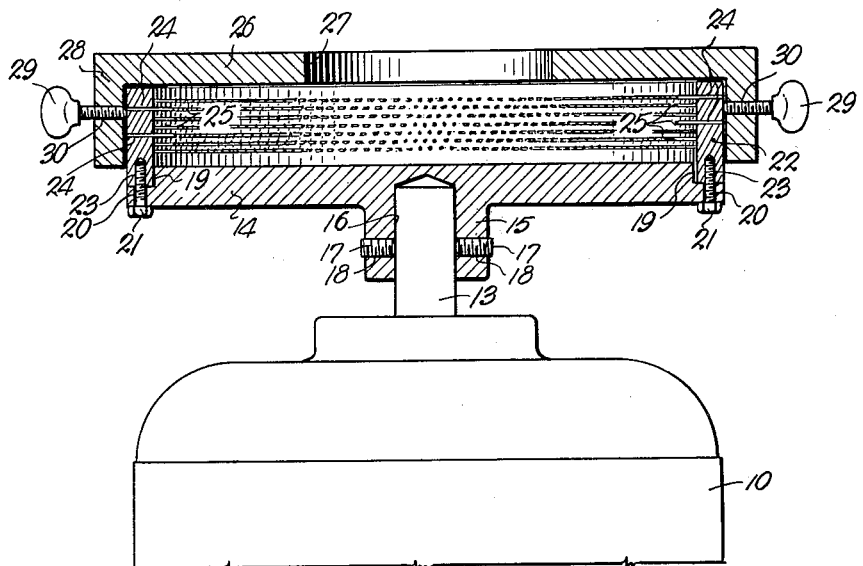
FIG. 2 is a side partly-sectional view of the mold of FIG. 1.

Turning to FIGS. 1 and 2, therein is shown in detail the parts of the centrifugal casting mold itself. Base plate 14 may be formed of cast iron or like material and has base 15 centrally thereof with socket 16 formed therein. Set screws 17 are threaded into openings 18 to grip the base plate 14 upon shaft 13. Plate 14 is preferably circular in plan view and has circumferential groove 19 therein. Openings 20 are formed upwardly through the base plate into the groove 19 to receive bolts 21 therein. Flange or ring 22 is circular in plan view and of an inner diameter substantially that of the outer diameter of the inner wall of groove 19 in the base plate 14 so as to fit closely thereon. The outer diameter of the ring 22 is preferably substantially that of the base plate 14. Threaded openings 23 are formed in the underside of ring 22 to permit the bolts 21 to thread thereinto whereby to rigidly fix the flange or ring 22 upon the plate 14. Flange 22 may be formed of cast iron or like metal. A plurality of relatively fine diameter holes 24 of uniform diameter are formed through flange 22. Ring 22 is preferably but not necessarily mounted at right angles to or normal to base plate 14 but holes 24 are necessarily radial to the axis of the shaft 13 and base plate 14. A plurality of frangible leads or elements 25 having an outer diameter substantially equal to the inner diameter of openings 24 in flange 22 or only slightly less than said inner diameter may be mounted within said holes 24 so as to extend radially into the cavity of the mold formed by flange 22 mounted on base plate 14. Openings 24 in flange 22 are preferably of uniform inside diameter and have uniform diameter openings into and out of the inside and outside faces of flange 22.

Cap 26 having a preferably circular central opening 27 therein and a downwardly extending peripheral flange 28 fixed thereto is mountable on flange 22 and fixable thereto by set screws 29 extending through openings 30 in peripheral flange 28. The inner diameter of flange 28 is preferably substantially equal to or only slightly greater than the outer diameter of flange 22 mounted on base plate 14 so as to frictionally fit therearound and closely back up the openings 24 through the flange 22. The depth of flange 28 is preferably sufficiently great so as to cover all of the openings 24 formed in flange 22 when the underside of cap 26 seats on flange 22. Flange 22 may be made integral with base plate 14, if desired. Opening 27 in the center of cap 26 must be sufficiently large to permit convenient pouring of metal to be centrifugally cast into the mold at a point at least slightly displaced from the center of base plate 14.

The frangible elements 25 employed as cores in the mold are preferably trimmed to a uniform length so as to extend centrally of the mold cavity a uniform distance as is seen in FIG. 1. As it is desired to cast rings with perforations of the smallest possible diameter, the outer diameters of the frangible elements 25 are as small as possible. A typical outer diameter of an element 25 employed in .025 inch. The clearance between the outer surface of the elements 25 and the inner surfaces of openings 24 in flange 22 should be as small as possible to get relatively secure positioning of the frangible elements in the mold, for example, .0005 inch maximum clearance. This clearance, however, must not be too small to prevent insertion of the leads into the mold from the outside. If the clearance is too close, the likelihood of breakage of the elements in insertion is too great. A typical inward extension of the elements into the mold would be 1¾₄ or .200 inch. The inward extension of the frangible elements into the mold, their outer diameter, etc., are somewhat variable. However, it should be kept in mind that the glass fibers desired to be produced in the production processes earlier mentioned are of the order of 4 to 5 microns (after gas attenuation) after extrusion through the holes in the cast rings. The composition of the frangible elements may vary but a typical successful composition is a mixture of graphite and clay, such as is in ordinary pencil leads. This mixture is preferably such as to obtain the maximum shear strength.

A typical mixture of graphite and clay would be 45 percent clay and 55 percent graphite. In a preferred form of the clay, 70 percent of a firing clay would be employed, 20 percent of a molding clay and 10 percent of a binding clay would be employed. Each of the three clays employed would be processed through a purification process. For the 55 percent graphite, three types are generally employed in a ratio of approximately 33⅓ percent of each. The types are high carbon content of Mexican amorphous, Ceylon flake and Domestic flake graphite. These terms are ones well known in the art. The method of mixing is by use of water. However, as all of these raw materials are mined, some adjustment must be made from time to time in these varying ratios. The above example is not intended to be limiting but merely as a typical useable example of a composition of a frangible element. Such a lead stick sample which would be inserted into a device holding it at approximately correct writing angle would break under approximately 3.25 ounces of pressure applied to the lead through the holding device. Again, this test is merely given as an example and an illustration, not a limiting statement.

A typical alloy composition for centrifugal casting in a mold as previously described would be chromium 20.5 to 23 percent; iron 17 to 20 percent; molybdenum 8 to 10 percent; cobalt .5 to 2.5 percent; tungsten .20 to 1.0 percent; carbon .05 to .15 percent; silicon 1 percent; manganese 1 percent, and the balance nickel. Such an alloy has a desired high temperature and high tensile strength characteristics required in the glass fiber production process previously delineated.

Referring now to FIG. 3, therein is shown a typical, conventional, small electric furnace operable to melt an alloy such as that immediately previously described and from which the alloy may be poured into the mold in the centrifugal process. Outer shell 31 is lined with refractory material 32, the latter defining furnace cavity 33. The cap for the furnace has outer shell 34 with inner refractory lining 35. Handles 36 are fixed to the outer shell of the furnace. Graphite electrodes 37 extend through openings 38 in the shell and refractory lining 32 of the furnace and have electrical leads 39 thereto. FIG. 5 shows a chute which may optionally be employed in the casting process. Base 40 mounts rod 41 upon which is mounted the chute. Outer shell 42 has refractory lining 43 which is formed into a trough down which the molten alloy may be poured.

FIG. 6 shows a typical finished cast ring 44 having a plurality of openings 45 formed therein as shown in FIG. 7. The spacing of the openings 45 in the ring is preferably that of an equilateral triangle. To achieve this spacing, the openings 24 in the ring 22 of the mold must be spaced in such manner, as well. FIG. 8 shows a cross section through the ring illustrating the preferred form of the openings 45, that is, of uniform diameter, with square faces.

In the practice of the inventive method, the leads 25, if not already of uniform length and of the desired length, are sheared to both. They are then placed in the openings 24 in the flange 22 extending interiorly of the mold cavity. This process may be done by hand but is generally machine assisted. The cap 26 is then fitted over the flange 22 and fixed thereto by set screws 29. Power source 10 is started and rotation of the mold with the core elements 25 therein is begun. A parting agent is then preferably applied to the metal base plate 14 and inner face of the flange 22 whereby to facilitate the removal of the cast ring from the mold after cooling thereof. A typical operable parting agent would be carbon black, applied as shown in FIG. 4, with an oxyacetylene torch running under low oxygen. Said carbon also serves as a heat conducting agent. The parting agent also is applied onto the frangible elements 25, as well. Other parting agents than carbon may be employed but that disclosed is convenient and workable. The mold is then preferably preheated (not shown) with a blow torch or the like applied to the periphery thereof to avoid chilling of the molten metal when poured therein. Employing the alloy previously described, a typical preheat temperature would be 600° F. The preheat preferably should not surpass by far, and is preferably under, the core destruction temperature. The mold is preferably brought up to speed in a horizontal position and then may be tilted as shown in FIGS. 4 and 5, if desired. The application of the parting agent and the preheating may be done either in the horizontal position as in FIG. 2 or in the tilted position as in FIGS. 4 and 5.

The pouring of the metal may be accomplished in the horizontal position but is preferably done in the tilted position of FIG. 5. Metal 46, melted in a furnace as shown in FIG. 3, may be poured through a chute as in FIG. 5 into the mold centrally of the periphery of base plate 14 and peripheral of the center thereof. Opening 27 in the cap 26 must be of sufficient diameter to permit pouring to the position desired. A typical rotation rate for the mold during the pouring operation is 1200 r.p.m. The metal moves out immediately to the periphery of the mold and up the flange 22 among the frangible cores 25. The spinning of the mold is then continued for any desired solidifying period. The rotation of the mold is then stopped and cooling of the ring permitted for a desired period to permit convenient handling for example, 15 minutes or more. Preferably, then, the connection between the cores in the cast ring and the mold are broken by passing a sharp object such as a knife peripherally of the ring between the ring 44 and the flange 22. The ring in cooling shrinks away from the flange 22 sufficiently to permit this operation. It may then be pulled or otherwise forced out of the mold. Frangible cores 25 then may be punched or drilled out individually from openings 45 and 24. Ring 45 may or may not be cast of extra thickness to permit machining of either or both the inner and outer surfaces of the ring to control the thickness of the ring or the surface characteristics thereof.

The mold is preferably tilted at least 30° and not greater than 45° from the horizontal in the pouring operation, if tilted. Typical thicknesses of a cast ring may range from .085 inch to .150 inch, after machining.

Figure 9:
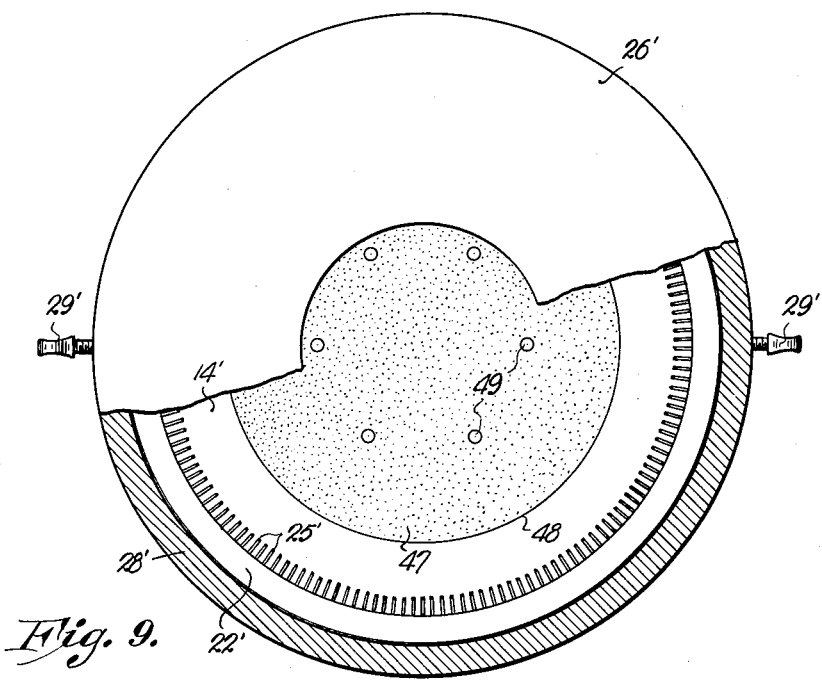
FIG. 9 is a plan view with parts cut away of a first modification of a rotatable mold embodying the invention.
Figure 10:
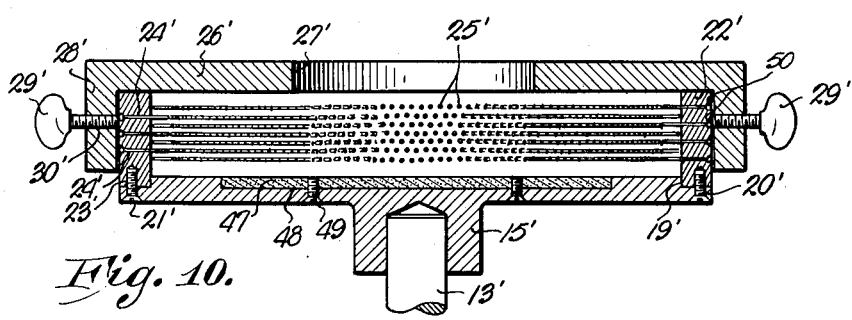
FIG. 10 is a side, partly-sectional view of the mold of FIG. 9.

In FIGS. 9 and 10, is shown a first modification of the inventive mold construction which differs from the mold construction of FIGS. 1 and 2 only in (1) the provision of a circular graphite insert 47 which is received in recess 48 and held in place by screws 49; and (2) counterboring of the holes or openings through the mold which receive the frangible elements at their outer extremities in the hold. Therefore, all of the parts which are identical to parts shown in FIGS. 1 and 2 are numbered alike as in those views but primed. The counterboring is shown at 50. It should also be noted that the mold of FIG. 2 could be counterbored, as well, to facilitate insertion of the lead if desired. The provision of the graphite insert 47 substantially increases the life of the mold. The insert 47 can be replaced when necessary and provides a surface to which the metal will not stick when it is poured into the mold. The operation of the mold of FIGS. 9 and 10 is the same as that of FIGS. 1 and 2.

Figure 11:
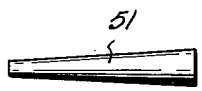
FIG. 11 is a first modification in shape of a frangible element or lead to be employed in a mold similar to those of FIGS. 1 and 2 or 9 and 10.
Figure 13:
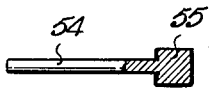
FIG. 13 is a third modification in shape of a frangible element or lead useable in a like mold.
Figure 12:
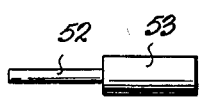
FIG. 12 is a second modification in shape of a frangible element or lead useable in a like mold.

FIGS. 11–13, inclusive, show varying shapes of leads which may be employed in molds of the types of FIGS. 1 and 2 and 9 and 10. FIG. 11 shows a uniformly tapered, frangible element which would require a uniformly tapered opening 24 or 24' through the side wall of the mold to be useable. Additionally, such lead would have to be inserted from the outside periphery of the mold. FIG. 12 shows a frangible element having a lesser diameter portion 52 and a greater diameter portion 53. The greater diameter portion 53 would be of a greater length than the width of the mold flange 22 or 22' so the greater diameter portion would extend into the operating portion of the mold. This would give a ring having an orifice of greater diameter at its periphery than centrally. FIG. 13 shows a frangible element having a lesser diameter portion 54 and a greater diameter portion 55. The greater diameter portion 55 is intended to be of a thickness equal to the thickness of the flange 22 or 22' of the mold. The purposes of these varying shaped leads are for reinforcement (FIG. 13), the provision of a tapered orifice through the ring (FIG. 11) or an orifice of uniform diameter through the ring with an enlarged peripheral portion (FIG. 12). The use of one or more of these shaped leads would depend upon a particular molding problem or a particular situation desired in the cast ring and its desired effects in the glass fiber production process. In certain instances, to remove such cores from a ring, a correspondingly shaped tool would necessarily be employed for punching out.

From the foregoing it will be seen that this invention is one well adapted to attain all of the ends and objects hereinabove set forth together with other advantages which are inherent to the methods and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. Apparatus for forming finely perforated rings comprising a centrifugal casting mold, said mold having a base plate at least substantially circular in form, a flange ring mounted on said base plate concentric to the center thereof and at a substantial angle thereto forming a mold cavity centrally thereof, said flange ring having a plurality of relatively small diameter openings extending entirely therethrough, a plurality of frangible mold core elements received in said flange ring openings and extending inwardly of said flange ring, means for rotating said base plate around the central axis thereof, a circumferential back up flange concentrically mounted on said flange ring and covering the outer ends of said openings, said back up flange closely fitting the peripheral surface of the flange ring, a cap for said flange ring peripherally connected to said back up flange and having a central opening therein of lesser inner diameter than the flange ring inner diameter, and means removably fixing the back up flange relative to the flange ring whereby to rotate therewith on said base plate.

2. Apparatus as in claim 1 wherein said openings extend radial to the central axis of the plate.

3. Apparatus as in claim 1 wherein the cap is integral with the back up flange.

4. Apparatus as in claim 1 wherein said openings are counterbored as they leave the peripheral surface of the flange ring.

5. Apparatus as in claim 1 including a removable pouring insert inset centrally of said base plate.

6. Apparatus as in claim 1 including a removable pouring insert inset centrally of said base plate below said cap opening and of greater diameter than said cap opening.

References Cited in the file of this patent
UNITED STATES PATENTS

| 1,038,682 | Thompson | Sept. 17, 1912 |
| 1,501,338 | Henry | July 15, 1924 |
| 2,042,015 | Moorman | May 26, 1936 |
| 2,391,523 | Sorenson | Dec. 25, 1945 |

FOREIGN PATENTS

| 626,041 | Great Britain | July 7, 1949 |